Patented Nov. 5, 1940

2,220,851

UNITED STATES PATENT OFFICE 2,220,851

TREATMENT OF HYDROCARBON OIL

William Schreiber, Philadelphia, Pa., assignor to The Atlantic Refining Company, Philadelphia, Pa., a corporation of Pennsylvania No Drawing. Application June 9, 1938, Serial No. 212,702

15 Claims. (Cl. 252—53)

The present invention relates to a method of producing improved lubricating oils, and particularly lubricating oils having increased film-strength and increased resistance to oxidation and/or sludging.

A further object of this invention is the production of lubricating oils for internal combustion engines, which oils, under severe operating conditions, are resistant to oxidation and cause substantially no corrosion of bearing metals, particularly copper-lead and copper-silver cadmium bearings of modern automotive engines.

A further object of this invention is the production of lubricating oils containing such concentration of agents for increasing film-strength and/or for preventing oxidation, sludging and corrosion that said oils may be blended with other oils to impart thereto the desirable properties hereinbefore mentioned.

In accordance with this invention, hydrocarbon lubricating oil or hydrocarbon oil containing lubricating oil components is subjected to thermal treatment in the presence of an organic compound of trivalent phosphorus and an oxidizing agent such as air. As a result of such treatment there are formed in the oil phosphorus-containing products, certain of which are soluble in the oil and constitute desirable agents for inhibiting oxidation, sludging or corrosion, and others of which are insoluble in the oil and are separated therefrom. Depending somewhat upon the quantity of organic phosphorus compound employed, the insoluble reaction products will constitute either a dark-colored, tarry sludge or a liquid product of unknown composition but differing from the tarry sludge in appearance and other properties. Whether the organic compound of phosphorus reacts directly with components of the oil under the conditions of treating, or whether the compound of phosphorus first decomposes under the conditions of treating and the decomposition products react with components of the oil is unknown. However, the reaction products are of a nature dissimilar to the organic compounds of phosphorus employed as treating agents.

Among the organic compounds of trivalent phosphorus which may be employed in accordance with this invention are the esters of phosphorous acid, including the alkyl, aryl, alk-aryl, and heterocyclic phosphites such as ethyl phosphite, propyl phosphite, butyl phospite, amyl phosphite, cyclohexyl phosphite, phenyl phosphite, cresyl phospite, xylenyl phosphite, naphthyl phosphite, ethyl phenyl phosphite, propyl phenyl phosphite, butyl phenyl phosphite, amyl phenyl phosphite, cresyl phenyl phosphite, naphthyl phenyl phosphite, ethylhexyl phosphite, furfuryl phosphite, pyridyl phosphite and the like. Esters other than the neutral or tri-esters may also be utilized, for example, mono- and di-esters such as mono-amyl di hydrogen phosphite, di cresyl hydrogen phosphite, mono-phenyl di hydrogen phosphite, dibutyl hydrogen phosphite and the like. Other organic compounds of trivalent phosphorus which may be employed are the phosphines such as tributyl phosphine, triamyl phosphine, triphenyl phosphine, and the alk-aryl phosphines, i. e., butyl phenyl phosphine and the like. The amides of phosphorous acid may likewise be utilized, for example, mono- and dibutyl phosphorous acid amide, mono- and diamyl phosphorous acid amide, the aryl amides such as phenyl phosphorous acid amide, toluyl phosphorous acid amide, and the like.

In carrying out this invention, hydrocarbon lubricating oil is admixed with an organic compound of trivalent phosphorus, for example, tricresyl phosphite, in an amount varying from about 0.25% to about 50% by volume, based on the oil. This mixture, in the form of a substantially homogeneous solution, is then subjected to heating to temperatures of from about 300° F. to about 500° F., and preferably from about 340° F. to about 450° F., in the presence of an oxidizing agent such as artificially introduced air or oxygen-containing gas, for a period of time varying from about 1 hour to 40 or 50 hours or more, depending upon the quantity of phosphorus compound added, the temperature, and the rate of introduction of the oxidizing agent. Oxidizing agents other than air may be suitably employed, for example, oxygen, ozone, ozonized air, oxides of nitrogen or other agents capable of supplying oxygen. The reaction ensuing during the thermal treatment appears to manifest itself in different ways. When quantities of tricresyl phosphite of the order of from about 0.25% to about 10% by volume are added to the oil to be treated and the mixture is heated to a temperature of from 300° F. to 500° F. for a period of from about 2 hours to 12 hours, in the presence of continuously supplied air or oxygen-containing gas, the homogeneous solution of oil and phosphite appears, at first, to become hazy, and upon continued heating, reaction occurs between the oil and the phosphite or decomposition products thereof. As a result of such reaction, a dark-colored, tarry sludge separates from the oil, and appears to continue to form and separate until the haze first mentioned disappears from the oil. During such thermal treatment it has been found that about ⅔ of the cresol present in the tricresyl phosphite initially added is carried out of the reaction mixture by the air introduced, along with phosphorus compounds of unknown composition. It appears, in general, that as long as the oil undergoing treatment contains free or unreacted phosphite, such oil will precipitate sludge when heated at 340° F. in the presence of air. In addition to the insoluble sludge thus formed, which has been found to contain phosphorus, there are also produced oil-soluble phosphorus-containing reaction products which remain in solution in the oil and impart thereto increased film strength, and the ability to resist oxidation, sludging and corrosion of metals. The oil produced by this treatment is, in general, light colored and does not discolor substantially, nor form sludge, nor corrode bearing metals, when subjected to air blowing at 340° F. for 22 hours. Furthermore, such treated oil contains a sufficient quantity of desirable phosphorus-containing reaction products that it may be blended, in amounts varying from about 1% to about 50%, with untreated lubricating oil to impart thereto film strength, and resistance to oxidation, sludging and corrosion.

On the other hand, when quantities of phosphite of the order of from about 10% to about 50% by volume are added to the oil to be treated and the mixture is heated to a temperature of from 300° F. to 500° F. for a period of from about 20 to about 50 hours, in the presence of continuously supplied air or oxygen-containing gas, the homogeneous solution of oil and phosphite appears, at first, to become hazy, and upon continued heating, the homogeneous solution separates into two liquid phases, one phase apparently comprising partially decolorized lubricating oil containing a concentrate of soluble phosphorus-containing film strength agents and inhibitors, and the other phase comprising dark-colored oil components, reaction products and unconverted phosphite. Upon permitting the reaction mixture to settle, the two liquid phases stratify into layers and may be separated from one another by decantation. In order to determine the completion of the thermal treatment, samples of the light-colored oil concentrate (upper layer) are periodically removed, diluted with untreated oil and subjected to air oxidation at 340° F. If the test sample deposits sludge, the treatment is incomplete and must be continued until the test sample shows no substantial discoloration and/or deposition of sludge. The lower layer comprising the dark-colored oil components, reaction products and unconverted phosphite may be employed to treat additional quantities of oil until such time as the phosphite content thereof is exhausted in the treating reaction. When conducting the thermal treatment of lubricating oil in the presence of from about 10% to about 50% by volume of phosphite, no tarry sludge is formed, as contrasted with the lower percentage treats, unless the treating period is extended beyond that indicated as complete by the test samples. The light-colored oil containing the concentrate of inhibitors may be employed, per se, as a lubricant but is preferably blended with untreated oil in quantities sufficient to impart the desired inhibiting effect to the blend.

Oils treated in accordance with this invention and containing substantial quantities of film strength agents and/or oxidation, sludging or corrosion inhibitors produced by the treating reaction may be subjected to selective solvent extraction whereby the film strength agents or inhibitors are concentrated in an oil fraction produced by the solvent extraction. Solvents such as aliphatic alcohols, esters, ketones, phenols, furfural, nitrobenzene and chlorex may be used. Or said oils containing substantial quantities of film strength agents or inhibitors may be contacted with an adsorbent medium such as fuller's earth, activated clay, silica gel, bauxite or the like, whereby the agents or inhibitors are adsorbed from the oil and concentrated in the adsorbent. Such agents or inhibitors may then be recovered, as concentrates, by washing the adsorbent with a solvent for the agents or inhibitors.

My invention may be further illustrated by the following examples, which, however, are not to be construed as limiting the scope thereof.

(1) Hydrocarbon oil having a Saybolt Universal viscosity of 430 seconds at 100° F., an A. P. I. gravity of 28.0°, and an O. D. color of 30 was admixed with 0.5% by volume of commercial tricresyl phosphite and heated for a period of 12 hours at a temperature of 340° F., air being blown through the mixture at a rate of 0.4 cubic foot per gallon per hour. The mixture became hazy, a tarry sludge was thrown down, and the haze disappeared toward the end of the heating period. The treated oil was decanted from the sludge and thereafter traces of sludge were removed by filtering through a non-adsorptive filter medium. This treated product, having an O. D. color of 60, was blended in the volume ratio of 1 to 3 with the same oil which had not been subjected to this treatment and there resulted a blend having an O. D. color of 35. A sample of this blended oil was subjected to an oxidation test comprising heating 100 cc. of the oil at 340° F. for 22 hours, air being blown through the sample at a rate of 3 liters per hour. At the end of the test period the blended oil was clear, free of sludge and had an O. D. color of 90. A sample of the initial, untreated oil, when subjected to the same oxidation test, had an O. D. color of 1200.

(2) Hydrocarbon oil having a Saybolt Universal viscosity of 430 seconds at 100° F., an A. P. I. gravity of 28.0°, an O. D. color of 30, and containing 1% by volume of tricresyl phosphate, was admixed with 0.5% by volume of commercial tricresyl phosphite and heated for a period of 8 hours at a temperature of 340° F., air being blown through the mixture at a rate of 0.4 cubic foot per gallon per hour. The mixture became hazy, a tarry sludge was precipitated, and the haze disappeared toward the end of the heating period. The treated oil was decanted from the sludge and thereafter traces of sludge were removed by filtration through a non-adsorptive filter medium. This product, having an O. D. color of 35, was blended in the volume ratio of 1 to 3 with the same oil which had not been subjected to this treatment and there resulted a blend having an O. D. color of 30. A sample of this blended oil was subjected to the 22 hour oxidation test above described, and at the conclusion thereof, the oil was found to be clear, free of sludge, and had an O. D. color of 95, as compared with 1200 for the untreated oil. Furthermore, the blended oil, when tested in an Almen extreme pressure lubricant testing machine at 200 R. P. M., sustained a load of 16,000 lbs./sq. in. projected bearing area before seizure of the bearing occurred.

(3) Hydrocarbon oil having a Saybolt Universal viscosity of 530 seconds at 100° F., an A. P. I. gravity of 27.5°, an O. D. color of 35, and containing 1% by volume of tricresyl phosphate, was admixed with 5% by volume of commercial tricresyl phosphite and heated for a period of 48 hours at a temperature of 340° F., air being blown through the mixture at a rate of 0.4 cubic foot per gallon per hour. The mixture became hazy, a tarry sludge was thrown down, and the haze disappeared toward the end of the heating period. The treated oil was decanted from the sludge and thereafter traces of sludge were removed by filtration through a non-adsorptive filter medium. This product, having an O. D. color of 75, was blended in the volume ratio of 2.5 to 97.5 with the initial, untreated oil of Example 1, and there resulted a blended oil having an O. D. color of 30. A sample of this blended oil was subjected to the 22 hour oxidation test hereinbefore described, and at the conclusion thereof, the oil was found to be clear, free of sludge, and had an O. D. color of 110, as compared with 1200 for the untreated blending oil.

(4) Hydrocarbon oil having a Saybolt Universal viscosity of 430 seconds at 100° F., an A. P. I. gravity of 28.0°, and an O. D. color of 30 was admixed with 10% by volume of commercial tricresyl phosphite and heated for a period of 44 hours at a temperature of 340° F., air being blown through the mixture at a rate of 0.4 cubic foot per gallon per hour. The mixture became hazy, a tarry sludge was precipitated, and the haze disappeared toward the end of the heating period. The treated oil was decanted from the sludge and thereafter traces of sludge were removed by filtration through a non-adsorptive filter medium. This product was blended in the volume ratio of 1 to 19 with the same oil which had not been subjected to this treatment. A sample of this blended oil was subjected to the 22 hour oxidation test hereinbefore described, and at the conclusion thereof, the oil was found to be clear, free of sludge and had an O. D. color of 130, as compared with 1200 for the untreated oil. The blended oil, when tested in an Almen extreme pressure lubricant testing machine at 200 R. P. M., sustained a load of 15,000 lb. per square inch projected bearing area before seizure of the bearing occurred, whereas the untreated oil failed at a pressure of 4,000 lbs./square inch projected bearing area. Furthermore, a cadmium-silver test bearing, when immersed in the blended oil for 44 hours at 340° F. through which air was blown at a rate of 3 liters per 100 cc. per hour, showed no loss in weight, whereas a similar bearing tested in the untreated oil showed a corrosion loss of 60 milligrams in weight.

(5) Hydrocarbon oil having a Saybolt Universal viscosity of 151 seconds at 100° F., an A. P. I. gravity of 32.1°, and an O. D. color of 5, was admixed with 25% by volume of commercial tricresyl phosphite and heated for a period of 64 hours at a temperature of 340° F., air being blown through the mixture at a rate of 0.4 cubic foot per gallon per hour. The mixture became hazy and two immiscible liquid phases separated, one comprising treated oil (upper layer) and the other (lower layer) comprising oil, reaction products and unconverted phosphite. The upper layer of treated oil was decanted from the lower layer and filtered through a non-adsorptive filter medium to remove traces of the insoluble second phase. The treated oil, having an O. D. color of 7, was blended in the volume ratio of 0.5 to 99.5 with the initial, untreated oil of Example 1, and there resulted a blended oil having an O. D. color of 35. A sample of this blended oil was subjected to the 22 hour oxidation test hereinbefore described, and at the conclusion thereof, the oil was found to be clear, free of sludge, and had an O. D. color of 130, as compared with 1200 for the untreated blending oil.

(6) Hydrocarbon oil having a Saybolt Universal viscosity of 305 seconds at 100° F., an A. P. I. gravity of 22.6° and an O. D. color of 300, was admixed with 25% by volume of commercial tricresyl phosphite and heated for a period of 11 hours at a temperature of 450° F., air being blown through the mixture at a rate of 0.4 cubic foot per gallon per hour. The mixture became hazy and two immiscible liquid phases separated, one comprising treated oil (upper layer) and the other (lower layer) comprising oil, reaction products, and unconverted phosphite. The upper layer of treated oil was decanted from the lower layer, filtered through a non-adsorptive filter medium to remove traces of the insoluble second phase. The treated oil was blended in the volume ratio of 1 to 49 with hydrocarbon oil having a Saybolt Universal viscosity of 151 seconds at 100° F., an A. P. I. gravity of 32.1°, and an O. D. color of 10, and there resulted a blended oil having an O. D. color of 15. A sample of this blended oil was subjected to the 22 hour oxidation test hereinbefore described, and at the conclusion thereof, the oil was found to be clear, free of sludge, and had an O. D. color of 75, as compared with 800 for the untreated blending oil. The blended oil, when tested in an Almen extreme pressure lubricant testing machine at 200 R. P. M., sustained a load of 15,000 lbs. per square inch projected bearing area, whereas the untreated blending oil failed at a pressure of 4,000 lbs. per square inch projected bearing area.

(7) Hydrocarbon oil having a Saybolt Universal viscosity of 430 seconds at 100° F., an A. P. I. gravity of 28.0°, and an O. D. color of 30, was admixed with 50% by volume of commercial tricresyl phosphite and heated for a period of 4 hours at a temperature of 450° F., air being blown through the mixture at a rate of 1.2 cubic feet per gallon per hour. The mixture became hazy and two immiscible liquid phases separated, one comprising treated oil (upper layer) and the other (lower layer) comprising oil, reaction products, and unconverted phosphite. The upper layer of treated oil was decanted from the lower layer and filtered through a non-adsorptive filter medium to remove traces of the insoluble second phase. The treated oil was blended in the volume ratio of 1 to 99 with the same oil which had not been subjected to this treatment, and there resulted a blended oil having an O. D. color of 35. A sample of this blended oil was subjected to the 22 hour oxidation test hereinbefore described, and at the conclusion thereof, the oil was found to be clear, free of sludge, and had an O. D. color of 200, as compared with 1200 for the untreated oil.

(8) Hydrocarbon oil having a Saybolt Universal viscosity of 163 seconds at 100° F., an A. P. I. gravity of 31.3°, and an O. D. color of 2, was admixed with 0.25% by volume of purified tri-p-cresyl phosphite and heated for a period of 8 hours at a temperature of 340° F., air being blown through the mixture at a rate of 0.4 cubic foot per gallon per hour. The mixture became hazy, a tarry sludge was precipitated, and the haze disappeared toward the end of the heating period. The treated oil was decanted from the sludge and thereafter traces of sludge were removed by filtration through a non-adsorptive filter medium. The resulting oil was clear and had an O. D. color of 8. A sample of this treated oil was subjected to the 22 hour oxidation test hereinbefore described, and at the completion thereof, the oil was found to be clear, free of sludge and had an O. D. color of 162, whereas the untreated oil, upon testing, had an O. D. color of 463 and contained sludge. Upon testing the treated oil in an Almen extreme pressure lubricant testing machine at 200 R. P. M., a pressure of 15,000 lbs. per square inch projected bearing area was sustained before seizure of the bearing occurred, whereas the untreated oil failed at a pressure of 4,000 lbs. per square inch projected bearing area.

(9) Hydrocarbon oil having a Saybolt Universal viscosity of 163 seconds at 100° F., an A. P. I. gravity of 31.3°, and an O. D. color of 2, was admixed with 0.5% by volume of purified tri-p-cresyl phosphite and heated for a period of 8 hours at a temperature of 340° F., air being blown through the mixture at a rate of 0.4 cubic foot per gallon per hour. The mixture became hazy, a tarry sludge was precipitated, and the haze disappeared toward the end of the heating period. The treated oil was decanted from the sludge and thereafter filtered through a non-adsorptive filter medium to remove traces of sludge. The resulting oil was clear and had an O. D. color of 6. A sample of this treated oil was subjected to the 22 hour oxidation test hereinbefore described, and at the completion thereof, the oil was found to be clear, free of sludge and had an O. D. color of 94, whereas the untreated oil, upon testing, had an O. D. color of 463 and contained sludge.

(10) Hydrocarbon oil having a Saybolt Universal viscosity of 163 seconds at 100° F., an A. P. I. gravity of 31.3°, and an O. D. color of 2, was admixed with 1.0% by volume of purified tri-p-cresyl phosphite and heated for a period of 8 hours at a temperature of 340° F., air being blown through the mixture at a rate of 0.4 cubic foot per gallon per hour. The mixture became hazy, a tarry sludge was precipitated, and the haze disappeared toward the end of the heating period. The treated oil was decanted from the sludge and thereafter filtered through a non-adsorptive filter medium to remove traces of sludge. The resulting oil was clear and had an O. D. color of 8. A sample of this treated oil was subjected to the 22 hour oxidation test hereinbefore described, and at the completion thereof, the oil was found to be slightly hazy, free of sludge and had an O. D. color of 126, whereas the untreated oil, upon testing, had an O. D. color of 463 and contained sludge.

(11) Hydrocarbon oil having a Saybolt Universal viscosity of 170 seconds at 100° F., an A. P. I. gravity of 31.0°, and an O. D. color of 7, was admixed with 0.7% by volume of p-tertiary amyl phenyl phosphite and heated for a period of 22 hours at a temperature of 340° F., air being blown through the mixture at a rate of 0.4 cubic foot per gallon per hour. The mixture became hazy, a tarry sludge was precipitated, and the haze disappeared toward the end of the heating period. The treated oil was decanted from the sludge and thereafter filtered through a non-adsorptive filter medium to remove traces of sludge. The resulting oil was clear and had an O. D. color of 30. A sample of this treated oil was subjected to the 22 hour oxidation test hereinbefore described, and at the completion thereof, the oil was found to be clear, free of sludge and had an O. D. color of 110, whereas the untreated oil, upon testing had an O. D. color of 927 and contained sludge.

It will be seen, from the above examples, that thermal treatment of lubricating oils in the presence of an oxidizing agent and an organic compound of trivalent phosphorous, and particularly an aryl ester of phosphorous acid, produces lubricating oils of increased film strength and increased resistance to oxidation, sludging and tendency to corrode bearing metals. In general, when employing gaseous oxidizing agents such as air, it is preferable to effect contacting with the oil by blowing, in order to shorten the treating period as much as possible. However, as an alternative, the mixture of oil and organic compound of trivalent phosphorus may be heated in the presence of air, in a substantially quiescent state, i. e., without blowing or vigorous agitation. This latter method is less desirable in view of the longer period required to complete the thermal treatment. The treated oils or concentrates may be subjected to a further treatment with dry caustic soda, soda solutions, or water, at normal or elevated temperatures, in order to remove traces of acidity which may remain as a result of the initial thermal treatment.

While the examples above given are primarily concerned with the treatment of hydrocarbon oils with aryl esters of phosphorous acid, it is to be understood that other organic compounds of trivalent phosphorus may be employed, including the alkyl phosphites, alk-aryl phosphites, mixed alkyl-aryl phosphites, organic phosphines, phosphorous acid amides, and the like.

Furthermore, the treatment described hereinabove is adapted to viscous hydrocarbon oils, i. e., lubricating oils or lubricating oil stocks produced by distillation, acid treatment, clay treatment, or solvent treatment, regardless of the source of the crude oils from which the lubricating oils or stocks may have been derived.

The improved oils produced in accordance with the present invention may be used, per se, as lubricants or may be employed in the manufacture of thickened oils or greases, or may be blended with fatty oils, synthetic esters, fatty acids, chlorinated and/or sulfurized compounds, alkali or heavy metal soaps, or other agents utilized in the production of compounded lubricants.

What I claim is:

1. The method of producing an improved lubricating oil which comprises adding to hydrocarbon oil containing lubricating oil components an organic compound of trivalent phosphorus, subjecting said mixture, in the presence of an oxidizing agent, to heat treatment at such temperature and for such period of time as to cause the formation of phosphorus-containing reaction products, a portion of which is soluble in said oil and a portion of which is insoluble in said oil, and separating said insoluble portion from said oil.

2. The method of producing an improved lubricating oil which comprises adding to hydrocarbon oil containing lubricating oil components an organic compound of trivalent phosphorus, subjecting said mixture, in the presence of an oxidizing agent, to heat treatment at such temperature and for such period of time as to cause the formation of phosphorus-containing reaction products, a portion of which is soluble in said oil and a portion of which is insoluble in said oil, separating said insoluble portion from said oil, and blending at least a portion of said oil with oil which has not been subjected to said treatment.

3. The method of producing an improved lubricating oil which comprises forming a substantially homogeneous solution of hydrocarbon oil containing lubricating oil components and an organic compound of trivalent phosphorus, subjecting the solution, in the presence of an oxidizing agent, to heat treatment at such temperature and for such period of time as to cause decomposition of said phosphorus compound and reaction with components of the hydrocarbon oil to form reaction products a portion of which is soluble in said oil and a portion of which is insoluble in said oil, and separating said insoluble reaction products from said oil.

4. The method of producing an improved lubricating oil which comprises adding to hydrocarbon oil containing lubricating oil components an organic compound of trivalent phosphorus, subjecting said mixture, in the presence of an oxygen-containing gas, to heat treatment at a temperature of from about 300° F. to about 500° F. for such period of time as to cause formation of phosphorus-containing reaction products, a portion of which is soluble in said oil and a portion of which is insoluble in said oil, and separating said insoluble portion from said oil.

5. The method of producing an improved lubricating oil which comprises adding to hydrocarbon oil containing lubricating oil components from about 0.25% to about 50% of an organic compound of trivalent phosphorus, subjecting said mixture, in the presence of an oxygen-containing gas, to heat treatment at a temperature of from about 300° F. to about 500° F. for such period of time as to cause the formation of phosphorus-containing reaction products, a portion of which is soluble in said oil and a portion of which is insoluble in said oil, and separating said insoluble portion from said oil.

6. The method of producing an improved lubricating oil which comprises adding to hydrocarbon oil containing lubricating oil components an ester of phosphorous acid, subjecting said mixture, in the presence of an oxidizing agent, to heat treatment at such temperature and for such period of time as to cause the formation of phosphorus-containing reaction products, a portion of which is soluble in said oil and a portion of which is insoluble in said oil, and separating said insoluble portion from said oil.

7. The method of producing an improved lubricating oil which comprises adding to hydrocarbon oil containing lubricating oil components an aryl ester of phosphorous acid, subjecting said mixture, in the presence of an oxidizing agent, to heat treatment at such temperature and for such period of time as to cause the formation of phosphorus-containing reaction products, a portion of which is soluble in said oil and a portion of which is insoluble in said oil, and separating said insoluble portion from said oil.

8. The method of producing an improved lubricating oil which comprises adding to hydrocarbon oil containing lubricating oil components tricresyl phosphite, subjecting said mixture, in the presence of an oxdizing agent, to heat treatment at such temperature and for such period of time as to cause the formation of phosphorus-containing reaction products, a portion of which is soluble in said oil and a portion of which is insoluble in said oil, and separating said insoluble portion from said oil.

9. The method of producing an improved lubricating oil which comprises adding to hydrocarbon oil containing lubricating oil components tricresyl phosphite, subjecting said mixture, in the presence of an oxygen-containing gas, to heat treatment at a temperature of from about 300° F. to about 500° F. for such period of time as to cause the formation of phosphorus-containing reaction products, a portion of which is soluble in said oil and a portion of which is insoluble in said oil, and separating said insoluble portion from said oil.

10. The method of producing an improved lubricating oil which comprises adding to hydrocarbon oil containing lubricating oil components from about 0.25% to about 50% of tricresyl phosphite, subjecting said mixture, in the presence of an oxygen-containing gas, to heat treatment at from about 340° F. to about 450° F. for such period of time as to cause the formation of phosphorus-containing reaction products, a portion of which is soluble in said oil and a portion of which is insoluble in said oil, and separating said insoluble portion from said oil.

11. The method of producing an improved lubricating oil which comprises forming a substantially homogeneous solution of hydrocarbon oil containing lubricating oil components and from about 0.25% to about 10% of tricresyl phosphite, subjecting the solution, in the presence of an oxygen-containing gas, to heat treatment at temperature of from about 340° F. to about 450° F. for such period of time as to cause formation of sludge insoluble in said hydrocarbon oil, and separating said insoluble sludge from said oil.

12. The method of producing an improved lubricating oil which comprises forming a substantially homogeneous solution of hydrocarbon oil containing lubricating oil components and tricresyl phosphite, subjecting the solution in the presence of an oxidizing agent to heat treatment at such temperature and for such period of time as to cause decomposition of said phosphite and reaction with components of the hydrocarbon oil to form reaction products a portion of which is soluble in said oil and a portion of which is insoluble in said oil, and separating said insoluble reaction products from said oil.

13. The method of producing an improved lubricating oil which comprises forming a substantially homogeneous solution of hydrocarbon oil containing lubricating oil components and from about 10% to about 50% of an aryl ester of phosphorous acid, subjecting the solution, in the presence of an oxygen-containing gas, to heat treatment at such a temperature and for such period of time as to cause the formation of phosphorus-containing reaction products, a portion of which is soluble in said oil and a portion of which is insoluble in said oil, and separating said insoluble reaction products from said oil.

14. The method of producing an improved lubricating oil which comprises forming a substantially homogeneous solution of hydrocarbon oil containing lubricating oil components and from about 10% to about 50% of tricresyl phosphite, subjecting the solution in the presence of an oxygen-containing gas to heat treatment at a temperature of from about 340° F. to about 450° F., and for such period of time as to cause the formation of phosphorus-containing reaction products, a portion of which is soluble in said oil and a portion of which is insoluble in said oil, and separating said insoluble reaction products from said oil.

15. The method according to claim 14 wherein at least a portion of the treated oil containing soluble, phosphorus-containing reaction products is blended with oil which has not been subjected to said treatment.

WILLIAM SCHREIBER.